United States Patent [19]

Bellati et al.

[11] 3,731,702
[45] May 8, 1973

[54] DEVICE FOR SUPPORTING THE VALVE BODIES OF TURBOMACHINES

[75] Inventors: Hans Bellati, Wettingen; Peter Pfenicher, Gebenstorf, both of Switzerland

[73] Assignee: Aktiengesellschaft Brown Boveri & Cie., Baden, Switzerland

[22] Filed: Feb. 29, 1972

[21] Appl. No.: 230,275

[30] Foreign Application Priority Data

Mar. 2, 1971   Switzerland..........................3051/71

[52] U.S. Cl.....................137/343, 60/108 R, 248/18
[51] Int. Cl. ..............................................F16f 15/00
[58] Field of Search .......................60/108; 137/343, 137/362; 248/15, 18, 204

[56] References Cited

UNITED STATES PATENTS 1,780,719   11/1930   Price.........................................248/18

*Primary Examiner*—Alan Cohan
*Assistant Examiner*—Gerald A. Michalsky
*Attorney*—Ralph E. Parker et al.

[57] ABSTRACT

Apparatus for supporting the body of a valve for a turbomachine such as a steam turbine on its foundation which is so constructed as to permit displacement of the valve body in three different directions at right angles to each other as a result of stresses imposed upon it when in service. To this end, the valve body is provided with three laterally extending support arms, each arm being connected in a flexible manner with a rigid support frame anchored to the foundation which permits the three different directions of movement. In addition, the support frames are each provided with means by which the corresponding arms on the valve body can be adjusted under restraint in at least two different directions at right angles to each other during assembly and also during dismantling of the valve body when out of service.

4 Claims, 3 Drawing Figures

Patented May 8, 1973                                  3,731,702

DEVICE FOR SUPPORTING THE VALVE BODIES OF TURBOMACHINES

The present invention relates to an improved device for supporting the body of a valve for a turbomachine, in particular a steam turbine, on the foundation, the valve body being connected to the casing of the turbomachine by means of a supply duct conveying the working medium.

The technique is well known whereby valve bodies, in particular of steam turbines, are connected direct to the turbine casing. This can be done by mounting the valve chests on the turbine casing or by rigidly connecting the turbine to the valve body by means of a connecting piece. These constructions have the disadvantage that, on the one hand, the turbine casings have to take the weight of the valves and, on the other, that forces due to relative movement between turbine casing and valve body occur which, in addition to the forces of thermal expansion and piping reaction, impose stresses on the turbine casing. This leads to considerable amounts of extra metal because it is difficult to determine the direction and magnitude of the forces, thus giving rise to a factor of uncertainty.

A technique is also known whereby the valve body is separate from the turbine casing and supported on the foundations by means of its own flexible mountings. The advantage of this arrangement, i.e. that stresses on the turbine casing caused by the forces mentioned above are avoided since the valve body is free to move during service, has hitherto appeared adequate. The drawbacks of this construction become evident during assembly and dismantling, and lie in the fact that fixing the position of the valve involves a considerable amount of extra work, and is difficult to achieve. The valve has to be fixed, however, in order to apply the necessary pre-stressing forces exerted by the piping.

The object of the present invention is to avoid the disadvantages stated above, and to provide a means of supporting the valve body which yields elastically accordingly to the movement of the valve during service in any direction.

This purpose is achieved by the device of the invention in that the valve body is provided with three arms fixed by way of bracing devices in a rigid supporting frame anchored to the foundation, such that during service each arm of the valve body is flexibly connected to the supporting frame by way of the bracing devices thereby to permit movement in three different directions at right angles to each other, and during assembly and dismantling can be moved under constraint in the supporting frame in at least two directions at right angles to each other.

A particular form of the device of the invention is characterized by the fact that the bracing device during service comprises a tie bolt with a rocker plate and a Belleville spring.

A particular form of the device is also characterized by the fact that the bracing device during assembly is provided with a tie bolt with rocker plate, and at least one pressure cylinder with its piston acting on the arm of the valve body and supported on the supporting frame.

The advantages of the invention lie in the fact that, by supporting the valve body on resilient flexible mountings, the valve is able to follow, in every direction, the forces due to thermal expansion and piping reaction, and additional stressing of the turbine casing is avoided. This in turn results in savings in material and simpler manufacture than with previous constructions.

Another advantage is the saving in space, since valves can be mounted on the same supporting frame, but one above the other and suspended separately.

A further advantage is that assembly and dismantling are simpler in that extensive preliminary work is eliminated because the valve body is pre-stressed relative to the turbine casing while fixed to the firmly anchored supporting frame. Because of the supporting frame and the bracing devices the valve body can be moved simply and in any direction necessary to counteract the piping forces and to some extent also the weight of the valve. This is particularly important because the direction and magnitude of the piping forces differ greatly from one installation to another.

The rocker plate, consisting of two cylindrical sections arranged at 90° to each other, minimizes the height of the bracing devices, despite the three-dimensional movement. This construction not only saves space, but has the added advantage that the bracing devices move by virtue of rolling friction, so that displacement of the valve body takes place virtually without friction, because the restraining forces caused by rolling friction at the rocker plates is negligible.

The accompanying drawings show an example of the device for supporting a valve body in accordance with the invention wherein.

Figure 1:
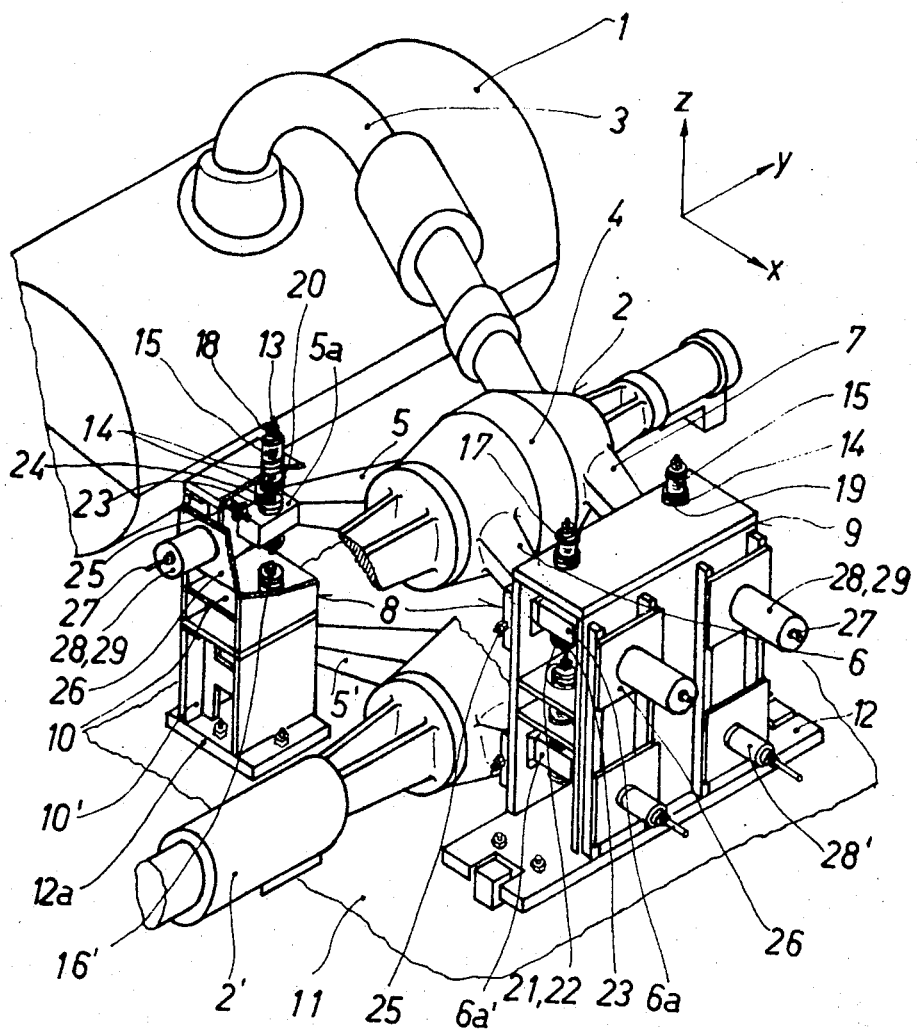
FIG. 1 shows a schematic three-quarter view of the device.

FIG. 1 is an isometric diagram of a steam-turbine casing 1 with pipe bend 3 of the crossover pipe which is connected to valve 2. The body 4 of valve 2 has laterally extending arms 5,6,7, the ends 5a, 6a, 7a of which are mounted in a supporting frame 8. Supporting frame 8 comprises a primary frame unit 9, for arms 6 and 7, and a secondary frame unit 10 which accommodates arm 5 and valve body 4. Supporting frame 8 is anchored to the foundation 11, the foundation plates 12 and 12a being fixed by means of anchor bolts.

The bracing devices for supporting valve 2 are mounted on supporting frame 8 and on secondary frame unit 10, which is shown partly sectioned. The bracing device consists of a tie bolt 13 which engages arm 5 and secondary frame unit 10 and which, by means of rocker plates 14 and 23 and Belleville springs 15, provides flexible suspension in the direction indicated by arrow z; the device consists further of pressure cylinder 28, mounted in the y-direction on secondary frame unit 10, the piston 29 of which engages the end 5a of arm 5 and allows movement. Deflection of arm 5 in the x-direction, as indicated by arrow x, is effected by a compression screw 25 mounted on secondary frame unit 10 and which has the same function as pressure cylinder 28.

Corresponding bracing devices for movable arms 6 and 7 are mounted on primary frame unit 9. It is possible, however, to provide arms 5,6 and 7 with at least two of the shifting devices described, e.g. arrange for arm 5 to move in directions $z$ and $y$, arm 6 in directions $x$, $y$ and $z$ and arm 7 in directions $z$ and $x$, without forfeiting any of the stated advantages.

Further advantage is gained by arranging the valves 2 of the high-pressure or intermediate-pressure sections of steam turbine 1 above one another, as indicated by valves 2 and 2'. Supporting frame 8 is then simply double the height and anchored to the same foundation 11.

In the case of the construction with simple flexible mountings described earlier, this arrangement was not possible because each mounting had to be supported separately on foundation 11, and more space was therefore required.

Figure 2:
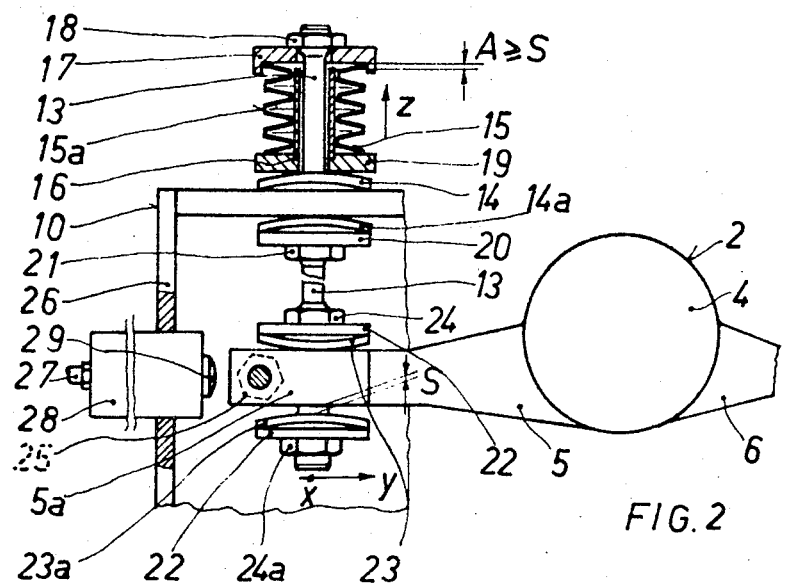
FIG. 2 shows a support for one valve arm during service.

To describe the invention more clearly, FIG. 2 shows one valve arm mounted on the supporting frame. The reference numbers correspond to the same parts as in FIG. 1. Arm 5 of valve body 4 is suspended from secondary frame unit 10 by means of tie bolt 13. Arm 5 is fastened to tie bolt 13 by adjusting nuts 24 and 24a enclosing rocker plates 23 and 23a. Washers 22 and 22a are placed between rocker plate 23 and adjusting nut 24, and between rocker plate 23a and adjusting nut 24a to ensure the mobility and rolling movement of rocker plates 23 and 23a with respect both to arm 5 and to secondary frame unit 10.

The other end of tie bolt 13 is attached to secondary frame unit 10 by way of rocker plates 14 and 14a, washer 20 with adjusting nut 21, pressure plate 19, Belleville springs 15, a pressure disc 17 and fixing nut 18.

In the outer wall of secondary frame unit 10 is a pressure cylinder 28, with piston 29, to which a compression medium is supplied through pipe 27. To fix the position of arm 5 completely, a compression screw 25 is fitted to secondary frame unit 10. This screw is provided with a lock nut and fits in a tapping in the upper section 26 of secondary frame unit 10, thus allowing easy adjustment.

Figure 3:
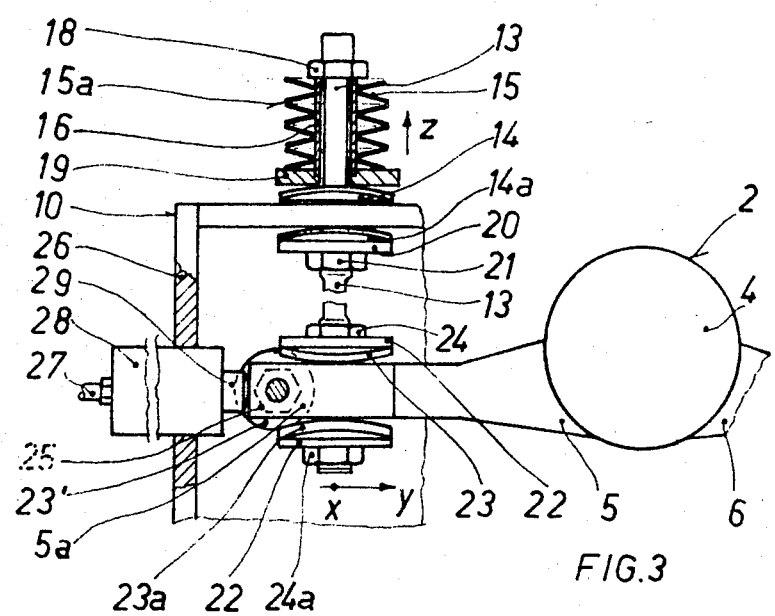
FIG. 3 shows a support for one valve arm during assembly.

The fixture as shown in FIG. 2 corresponds to the situation during service, while FIG. 3 shows the same device for suspending the arm, but during assembly or dismantling. The situation of the parts in FIG. 3, which are denoted by the same reference numbers as in FIG. 2, differs from the situation in FIG. 2 in that pressure cylinder 28 and compression screw 25 are rigidly engaged on valve arm 5, and Belleville springs 15 on the bolt 13 are rendered ineffective.

The operation of the mounting is described in more detail below, the description relating to the situation in the service condition.

A flexible mounting is provided to avoid additional forces from being applied to the turbine casing because the pipe bend between the valve body and turbine casing is inflexible. Compensating movement is possible in all directions. The Belleville springs 15 on the tie bolt have a travel of A and allow the flexible suspension to move in the direction of arrow $z$. Belleville springs 15 have been chosen because these have a high specific work capacity and attenuate any oscillations by friction. The Belleville springs 15 are guided by a sleeve 16 in which tie bolt 13 can move axially. This prevents oblique loading of springs 15 when rocker plates 14 tip, because the spring assembly 15a follows the movement. After the position of valve body 2 has been fixed, the fixing nut 18 is made to bear on sleeve 16 by removing pressure disc 17, so that during assembly the Belleville springs 15 are excluded from the train of forces. In the service condition the pressure disc 17 bears on sleeve 16 after a certain spring travel A.

The rocker plates 14 have convex cylindrical rolling surfaces, thus allowing arm 5 to deviate from the rest position in the direction of arrows $x$ and/or $y$, accompanied by movement of tie bolt 13 and Belleville spring 15. The rocker plates 14, 14a and 23,23a mounted on tie bolt 13 are adjusted by means of nuts 24 and 21 in such a way that arm 5 can roll on one pair of rocker plates or the other, i.e. 14,23 or 14a,23a. For this reason a clearance S is provided between rocker plates 14,23 or 14a,23a and arm 5 or supporting frame 8 so that, on the one hand, the change in relative height between the rolling surfaces of rocker plates 14 and 23 caused by deflection from the rest position can be compensated and so that, on the other, the pair of rocker plates 14,23 or 14a,23a affected at any given time by the compressive or tensile forces acting on valve arm 5 remain free to move on arm 5 and supporting frame 8. The pair of rocker plates 14,23 or 14a,23a with clearance can then move without the application of force and without impeding the rolling movement, so that the movements of the valve body take place almost without resistance.

When the valve bodies 2 or 2' are assembled or dismantled, the pipe bends 3 must be assembled or dismantled, starting from the valves and proceeding to the turbine casing. For this, the valves 2,2' must be moved to counter the effect of piping forces on the mounting. The direction and magnitude of these forces are undefined and differ from one installation to another. Also, in the period between dismantling and re-assembly, the valves 2,2' must be fixed in their position relative to the turbine casing 1. For this purpose there are compression screws 25 and pressure cylinders 28 with pistons 29. These apply the compressive forces necessary to adjust the valve position and to overcome the forces exerted by pipe bend 3.

The valve arms 5,6,7 extend beyond the flexible mountings so that the adjusting devices mentioned can act in the directions of arrows $x,y$ and $z$.

The procedure when fixing the position is simple in that pressure disc 17 resting on spring assembly 15a on tie bolt 13 is removed, and arm 5 is fixed in the $z$-direction by means of spacer sleeve 16 provided to guide the Belleville springs 15. The piston 29 of pressure cylinder 28 is then applied to arm 5 in the $y$-direction, and compression screw 25 is moved in the $x$-direction to hold arm 5 rigidly against secondary frame unit 10.

This procedure is carried out for each arm 5,6 and 7 so that the position of valve body 4 or 4' is fixed relative to the turbine casing 1.

To vary the amount of displacement, the travel of piston 29 is adjusted and the settings of compression screw 25 and the tie bolt are altered accordingly by loosening, adjusting and then tightening adjusting nuts 21,24.

When the pipe bends 3 are in the prescribed position and assembly work on the crossover pipe, turbine casing 1 and valve body 4 is complete, pressure discs 17 are replaced in position and held by nut 18. The pistons 29 of pressure cylinders 28 and the compression screws 25 are then released from valve arm 5, and valve body 4 settles to its relative rest position.

It is to be understood that the pressure cylinders can be replaced by mechanical devices, or the compression screws by, for example, pneumatic means of adjustment.

We claim:

1. Apparatus for supporting the body of a valve for a turbomachine such as a steam turbine on the foundation on which the turbomachine is mounted and wherein the valve body is connected to the casing of the turbomachine by means of a supply duct carrying the working fluid from the valve body to the turbomachine, the improvement wherein said valve body is provided with at least three support arms extending laterally therefrom, a rigid supporting frame for each of said support arms, said supporting frames being anchored to the foundation, flexible means connecting each of said arms to its corresponding supporting frame and which permit displacement of said valve body in three different directions at right angles to each other as a result of stresses imposed thereon when in service, and means carried by each of said supporting frames for adjusting the corresponding arm under restraint in at least two different directions at right angles to each other during assembly and also during dismantling of said valve body when out of service.

2. Apparatus as defined in claim 1 for supporting the body of a valve for a turbomachine wherein said flexible means connecting each of said arms to its corresponding supporting frame is constituted by a tie bolt interconnecting the arm and frame, said tie bolt being fitted with spring means permitting displacement of said arm in its supporting frame in the direction of axis of said tie bolt and said tie bolt being further provided with convexly curved rocker plates establishing a rolling contact with said supporting frame and also with said arm for permitting said arm to be displaced in its two other said directions of right angles to each other and which lie at a right angle to the axis of said tie bolt.

3. Apparatus as defined in claim 2 for supporting the body of a valve for a turbomachine wherein each of said rocker plates is constituted by a ring cylindrical disc having on its cross-sectional surfaces two cylindrical segments, the cylinder axes of which are displaced 90° relative to each other in parallel planes.

4. Apparatus as defined in claim 1 for supporting the body of a valve for a turbomachine wherein said means carried by each of said supporting frames for adjusting the corresponding arm under restraint during assembly and also during dismantling of said valve body when out of service includes a cylinder-and-piston unit mounted on the supporting frame, the piston of which is movable into pressure engagement against a face of said arm.

* * * * *